US010047841B2

(12) United States Patent
You (10) Patent No.: US 10,047,841 B2
(45) Date of Patent: Aug. 14, 2018

(54) SINGLE-SHAFT TWO-SPEED DRIVE SYSTEM

(71) Applicant: ETR CO., LTD., Hwaseong-si, Gyeonggi-do (KR)

(72) Inventor: Kwang Suk You, Suwon-Si (KR)

(73) Assignee: ETR CO., LTD. (KR)

( * ) Notice: Subject to any disclaimer, the term of this patent is extended or adjusted under 35 U.S.C. 154(b) by 0 days.

(21) Appl. No.: 15/368,555

(22) Filed: Dec. 2, 2016

(65) Prior Publication Data

US 2018/0051783 A1 Feb. 22, 2018

(30) Foreign Application Priority Data

Aug. 16, 2016 (KR) .......................... 10-2016-0103511

(51) Int. Cl.
*F16H 37/08* (2006.01)
*F16H 3/66* (2006.01)

(52) U.S. Cl.
CPC .......... *F16H 37/0813* (2013.01); *F16H 3/66* (2013.01); *F16H 2200/0034* (2013.01); *F16H 2200/2007* (2013.01); *F16H 2200/2033* (2013.01)

(58) Field of Classification Search
None
See application file for complete search history.

(56) References Cited

U.S. PATENT DOCUMENTS

| 2015/0099601 A1* | 4/2015 | Zhang | B62M 11/14 475/150 |
| 2017/0059023 A1* | 3/2017 | Severinsson | B60K 6/48 |
| 2017/0074378 A1* | 3/2017 | Kirchner | B60K 1/04 |
| 2017/0254396 A1* | 9/2017 | Pritchard | B60K 17/08 |

FOREIGN PATENT DOCUMENTS

| KR | 100195022 B1 | 6/1999 |
| KR | 101341384 B1 | 12/2013 |
| KR | 101374872 B1 | 3/2014 |

* cited by examiner

*Primary Examiner* — Jacob S. Scott
(74) *Attorney, Agent, or Firm* — Renaissance IP Law Group LLP (57) ABSTRACT

Disclosed herein is a single-shaft two-speed drive system including a synchronizer. The single-shaft two-speed drive system includes: a housing; a motor unit including a stator and a rotor; a first planetary gear set including a first sun gear, a plurality of first planetary gears, a first ring gear, and a first carrier; a second planetary gear set including a fastening cone, an integrating cone, a synchronizer, a second sun gear, a plurality of second planetary gears, a second ring gear, and a second carrier; and a differential; wherein the sleeve is moved in a direction of the fastening cone and coupled to the fastening cone to thus obtain a single gear reduction ratio and the sleeve is moved in a direction of the integrating cone and coupled to the integrating cone to thus obtain driving power without gear reduction.

2 Claims, 6 Drawing Sheets

SINGLE-SHAFT TWO-SPEED DRIVE SYSTEM

BACKGROUND

1. Technical Field

The present invention relates generally to a single-shaft two-speed drive system for an electric vehicle, and more particularly to the field of application of a technology for implementing gear reduction ratios based on the gear reduction and direct coupling of planetary gears to an electric vehicle and similar drive systems.

2. Description of the Related Art

Conventional drive units for an electric vehicle are composed of a housing configured to surround a motor, a gear box, and a differential configured to receive the driving power of the gear box. In these conventional drive units, the gear box and the differential are disposed on separate shafts. There are many cases where the power transmission path of a drive unit for an electric vehicle is composed of two shafts. A motor composed of a rotor and a stator is disposed inside a housing, one end of a first shaft is coupled to be operated in conjunction with the rotor, the other end of the first shaft is coupled to be operated in conjunction with a differential on the same axial line, and the differential is coupled to a gear box having a second shaft of a different phase difference. In connection with this, Korean Patent No. 0195022 entitled "Drive Device for Electric Vehicle" and issued on Feb. 10, 1999 was disclosed. The drive device of this patent is disadvantageous in that a space in which a gear box is installed is limited and overall volume and weight are increased because the drive device of this patent has a structure in which the gear box is required to be disposed outside the housing. Furthermore, the conventional drive units are problematic in that fuel efficiency is decreased because volume and weight are increased due to the structural characteristics of a connection structure that connects multiple shafts.

To overcome the above problems, there was proposed Korean Patent No. 1374872 entitled "Drive Unit Device for Electric Vehicle" and published on Mar. 10, 2014. In the drive unit device of this patent, at least one planetary gear set, a motor, and a differential are densely disposed along the same axial line within a single housing, so that a limitation related to an installation space can be reduced by decreasing the volume of the device, the number of parts and weight can be reduced, and noise and vibration can be reduced due to the characteristic in which the generation of power and gear reduction action are simultaneously performed on the single same axial line. However, the drive unit device of this patent is problematic in that a gear reduction ratio suitable for the inherent characteristic of the planetary gear set can only be passively obtained.

SUMMARY

The conventional drive systems obtain gear reduction by using a difference in rotation ratio in such a way as to enable a small gear to rotate a large gear on a shaft parallel to the shaft of the small gear in order to implement reduction. The present invention is intended to obtain two gear reduction ratios along the same axial line without a change in axis by means of a synchronizer and a planetary gear set by using the characteristics of planetary gears.

Accordingly, an embodiment of the present invention provides a drive system that can implement two speeds by using a synchronizer and a single planetary gear set.

Another embodiment of the present invention provides a drive system that can implement two speeds by using a synchronizer and two single planetary gear sets.

According to an aspect of the present invention, there is provided a single-shaft two-speed drive system configured to enable generation of power and gear reduction to be performed on a single drive shaft, the system including:

a housing;

a motor unit including a stator fastened onto an inner circumferential surface of the housing and configured such that a coil is wound around an outer circumferential surface thereof, and a rotor disposed outside the stator and configured to be rotated in response to application of power to the coil;

a first planetary gear set including:
a first sun gear configured to be rotated in conjunction with the rotor, and configured such that a plurality of gear teeth are formed on an outer circumferential surface thereof;
a plurality of first planetary gears configured to engage with gear teeth of the first sun gear and be operated in conjunction with the first sun gear;
a first ring gear configured such that an internal gear adapted to engage with the first planetary gears is formed on an inner circumferential surface thereof; and
a first carrier configured to couple the plurality of first planetary gears so that they are operated in conjunction with each other;

a fastening cone located on an outer circumferential surface of the first ring gear, and fastened to an inner circumferential surface of the housing;

an integrating cone mounted on an outer circumferential surface of the first carrier;

a synchronizer disposed between the fastening cone and the integrating cone; and a differential located on a remaining side surface of the integrating cone, and connected to be operated in conjunction with the first carrier;

wherein the synchronizer includes: a hub mounted on an outer circumferential surface of the first ring gear, a sleeve coupled onto an outer circumferential surface of the hub in a spline manner, and configured to be laterally moved along the outer circumferential surface of the hub; and first and second synchronizer rings disposed on both surfaces of the sleeve; wherein the first synchronizer ring is located on one side surface of the fastening cone and the second synchronizer ring is located on one side surface of the integrating cone; and wherein the sleeve is moved in a direction of the fastening cone and coupled to the fastening cone to thus obtain a single gear reduction ratio and the sleeve is moved in a direction of the integrating cone and coupled to the integrating cone to thus obtain driving power without gear reduction.

The single-shaft two-speed drive system may further include a second planetary gear set disposed between the integrating cone and the differential; and the second planetary gear set may include:
a second sun gear located on a remaining side surface of the integrating cone, and configured to be rotated in conjunction with the first carrier and have a plurality of gear teeth on an outer circumferential surface thereof;
a plurality of second planetary gears configured to engage with gear teeth of the second sun gear and be operated in conjunction with the second sun gear;
a second ring gear configured to have an internal gear, engaging with the second planetary gears, on an inner circumferential surface thereof, and fastened onto an inner circumferential surface of the housing; and a second carrier connected such that the plurality of second planetary gears are operated in conjunction with each other;

wherein the differential is connected to be operated in conjunction with the second carrier; and wherein the sleeve is moved in a direction of the fastening cone and coupled to the fastening cone to thus obtain one gear reduction ratio, and the sleeve is moved in a direction of the integrating cone and coupled to the integrating cone to thus obtain another gear reduction ratio.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Single-shaft two-speed drive systems according to embodiments of the present invention will be described in detail below with reference to the accompanying drawings.

In the following description of the present invention, a detailed description of a well-known function or component will be omitted when it is determined that the detailed description may make the gist of the present invention obscure. The terms used herein are terms that are defined by taking into account the functions thereof in the present invention. The meanings of the terms may differ depending on a user's intention, an operator's intention, practice or the like. Therefore, the terms should be defined based on the overall content of the specification.

A single-shaft two-speed drive system including a synchronizer according to the present invention is described. The terms used herein to refer to the components of the single-shaft two-speed drive system and the terms used herein to describe driving characteristics are intended for ease of description. Accordingly, the present invention is not limited by the terms used herein, and other terms that refer to objects having equivalent technical meanings may be used.

Figure 1:
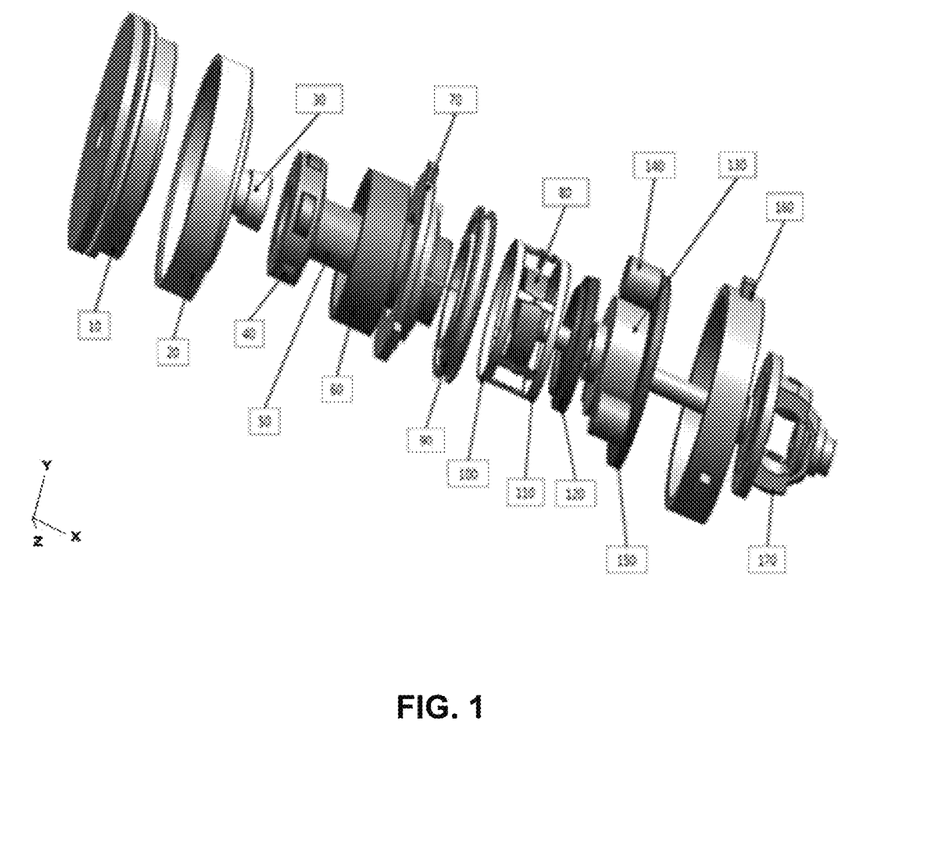
FIG. 1 is a perspective view schematically showing the structure of a single-shaft two-speed drive system including two planetary gear sets and a synchronizer according to an embodiment of the present invention.

FIG. 1 schematically shows the structure of a single-shaft two-speed drive system including two planetary gear sets and a synchronizer according to an embodiment of the present invention. This drawing is intended to allow the structure of the single-shaft two-speed drive system including two planetary gear sets and a synchronizer to be easily understood.

Figure 2:
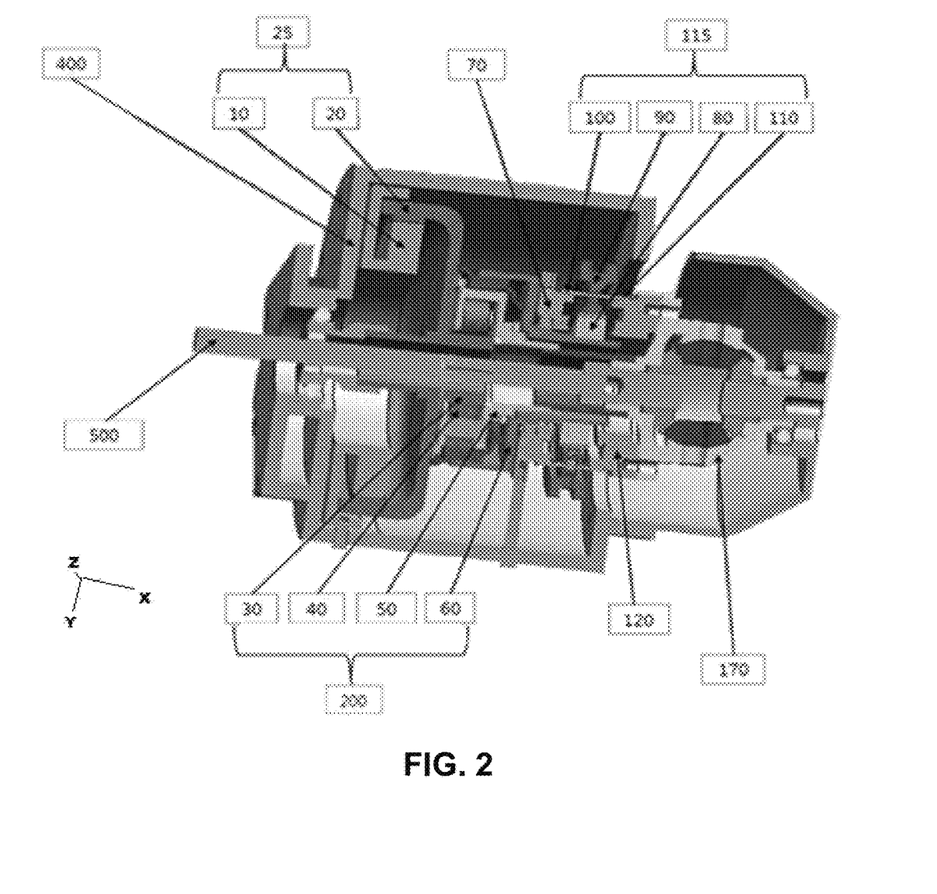
FIG. 2 is a sectional view showing the structure of a single-shaft two-speed drive system including a single planetary gear set and a synchronizer according to an embodiment of the present invention.
Figure 3:
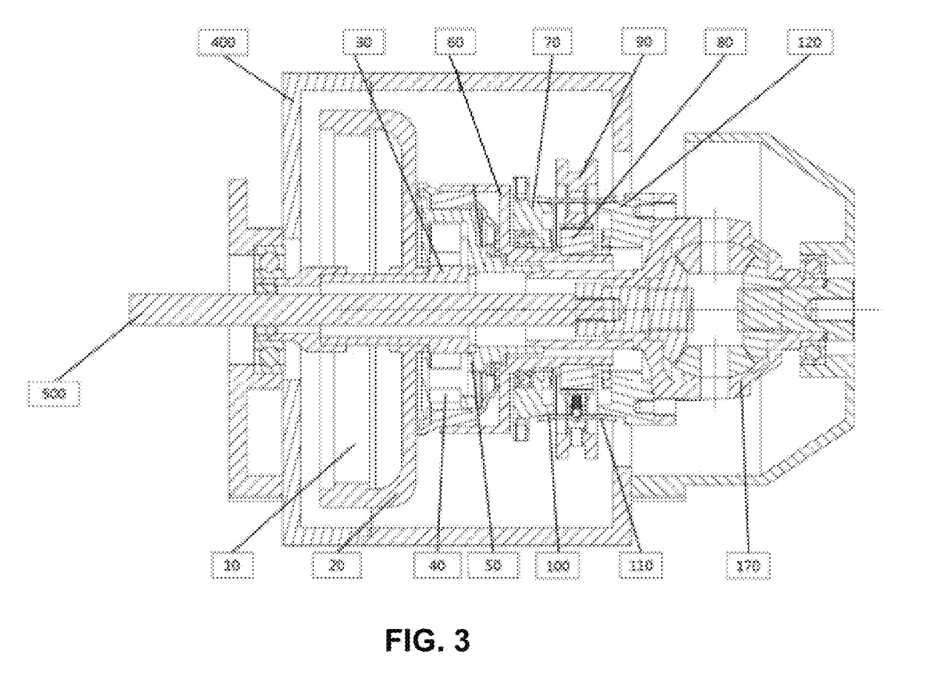
FIG. 3 is a plan sectional view of FIG. 2.
Figure 4:
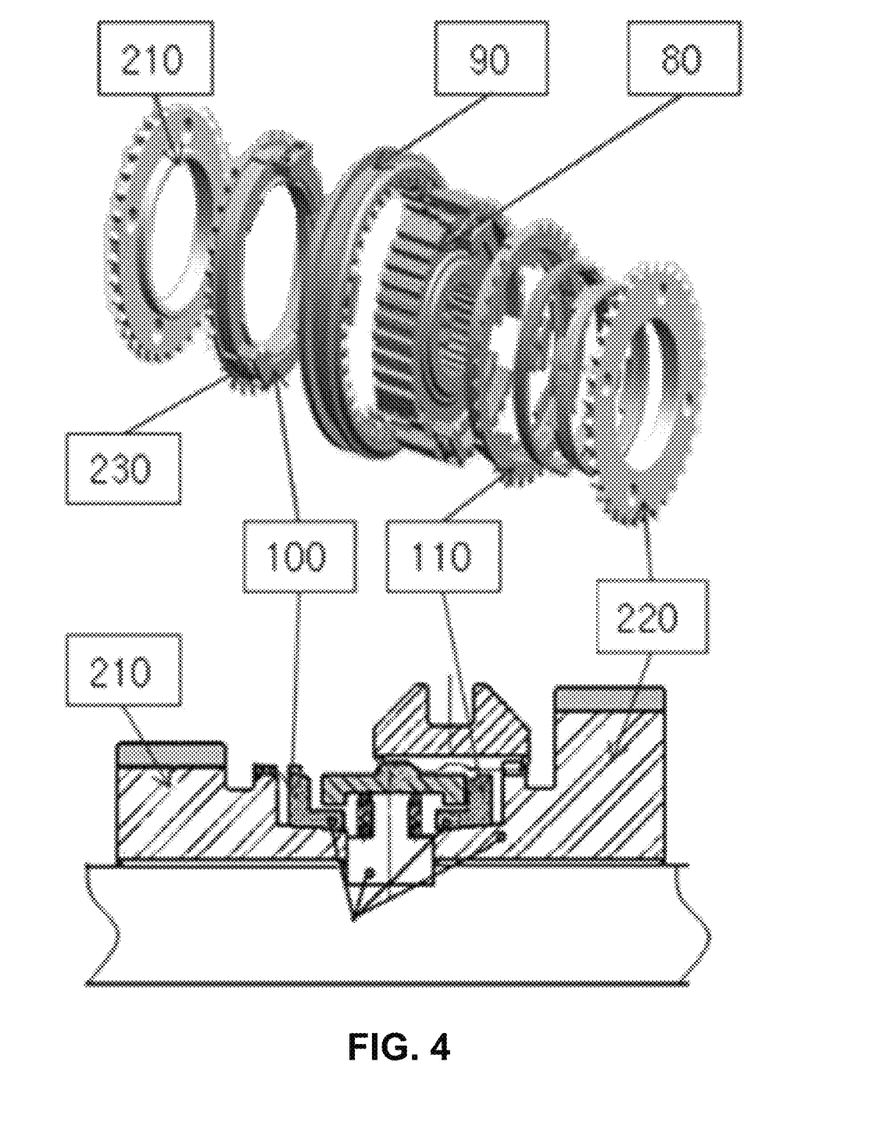
FIG. 4 shows the structure of a typical synchronizer.

FIG. 2 shows the structure of a single-shaft two-speed drive system including a single planetary gear set and a synchronizer according to an embodiment of the present invention. FIG. 3 is a sectional view of FIG. 2. FIG. 4 shows the structure of a typical synchronizer. In FIGS. 1 to 3, the illustration of the teeth of gears is omitted.

Referring to FIGS. 2 to 4, the single-shaft two-speed drive system includes a housing 400, a motor unit 25, a first planetary gear set 200, a fastening cone 70, a synchronizer 115, an integrating cone 120, and a differential 170.

The motor unit 25 includes a stator 10 and a rotor 20, and the first planetary gear set 200 includes a first sun gear 30, a plurality of first planetary gears 40, a first ring gear 60, and a first carrier 50. The synchronizer 115 includes a hub 80, a sleeve 90, a first synchronizer ring 100, and a second synchronizer ring 110.

The motor unit 25 includes the stator 10 fastened onto the inner circumferential surface of the housing 400 by a fastening means, such as a bolt or the like, and configured such that a coil is wound around the outer circumferential surface thereof, and a rotor 20 disposed outside the stator 10 and configured to be rotated in response to the application of power to the coil. In an embodiment, the motor unit 25 may include a rotor disposed inside a stator, unlike the motor unit 25 shown in FIG. 2, or may include a motor unit commonly used. This feature may be applied to the embodiment of FIG. 2.

The first planetary gear set 200 is configured to include: a first sun gear 30 configured to be rotated in conjunction with the rotor 20, and configured such that a plurality of gear teeth are formed on the outer circumferential surface thereof; a plurality of first planetary gears 40 configured to engage with the gear teeth of the first sun gear 30 and be operated in conjunction with the first sun gear 30; a first ring gear 60 configured such that an internal gear adapted to engage with the first planetary gears 40 is formed on the inner circumferential surface thereof; and a first carrier 50 configured to couple the plurality of first planetary gears 40 so that they are operated in conjunction with each other. The first planetary gears 40 are rotatably coupled to the first carrier 50, and the first carrier 50 is rotated by the constraining force of the first planetary gears 40.

The fastening cone 70 is located on the outer circumferential surface of the first ring gear 60, and is fastened to the inner circumferential surface of the housing 400. In embodiments of the present invention, the fastening cone 70 may have various shapes. These various shapes may be applied to the embodiment of FIG. 2.

The integrating cone 120 is mounted on the outer circumferential surface of the first carrier 50. In embodiments of the present invention, the integrating cone 120 may have various shapes. These various shapes may be applied to the embodiment of FIG. 2.

The synchronizer 115 is disposed between the fastening cone 70 and the integrating cone 120. The hub 80 of the synchronizer 115 is mounted on the outer circumferential surface of the first ring gear 60, and the sleeve 90 of the synchronizer 115 is coupled onto the outer circumferential surface of the hub 80 in a spline manner and laterally moved along the outer circumferential surface of the hub 80. The first and second synchronizer rings 100 and 110 of the synchronizer 115 are disposed on both surfaces of the sleeve 90. The first synchronizer ring 100 is located on one side surface of the fastening cone 70, and the second synchronizer ring 110 is located on one side surface of the integrating cone 120.

The synchronizer 115 is a synchronizer having a typical structure including the hub 80, the sleeve 90, the first synchronizer ring 100, and the second synchronizer ring 110. In various embodiments of the present invention, the hub 80, sleeve 90, and first and second synchronizer rings 100 and 110 of the synchronizer 115 may have different shapes and structures. These different shapes and structures may be applied to the embodiment of FIG. 2. The first and second synchronizer rings 100 and 110 of the synchronizer 115 may have a structure, such as those shown in FIGS. 2 to 4. Although not shown in FIGS. 2 to 4, the first and second synchronizer rings 100 and 110 may have the structure of a commonly used synchronizer ring or the structures of synchronizer rings having various shapes. In various embodiments of the present invention, the first and second synchronizer rings 100 and 110 of the synchronizer 115 may have not only various shapes but also various structures in which the first synchronizer ring 100 and the second synchronizer ring 110 are coupled to each other. Each of the first synchronizer ring 100 and the second synchronizer ring 110 may be plural in number. These features may be applied to the embodiment of FIG. 2.

The first and second synchronizer rings 100 and 110 generally function to forcibly hold and decelerate or accelerate counterpart gears, rotating at the different numbers of revolutions, by using strong frictional force, like a brake, because a friction material is attached onto the inner circumferential surface or outer circumferential surface of each of the synchronizer rings, thereby adjusting the numbers of revolutions of the two gears to the same value. In an embodiment of the present invention, the first synchronizer ring 100 is coupled to the fastening cone 70 and performs frictional action when the sleeve 90 moves in the direction of the fastening cone 70, and the second synchronizer ring 110 is coupled to the integrating cone 120 and performs frictional action when the sleeve 90 moves in the direction of the integrating cone 120.

The differential 170 is located on the other side surface of the integrating cone 120, and is connected to be operated in conjunction with the first carrier 50. The differential 170 includes a differential that is commonly used in a drive system. Other differentials that perform a differential function are included in embodiments of the present invention. These differentials may be applied to the embodiment of FIG. 2.

A first embodiment of the present invention having the above-described configuration will be described as follows.

When power is applied to the coil, the rotor 20 is rotated. The rotor 20 engages with the first sun gear 30. Accordingly, when the rotor 20 is rotated, rotating power is transferred to the first sun gear 30, and thus rotates the first sun gear 30. The first sun gear 30 rotates the engaged first planetary gears 40. The first sun gear 30 and the first planetary gears 40 are rotated in opposite directions, and the first planetary gears 40 and the first carrier 50 are rotated in the same direction. Since the first planetary gears 40 engage with the first sun gear 30 on the inner sides thereof and engage with the internal gear of the first ring gear 60 on the outer sides thereof, they perform revolution and rotation. The first carrier 50 is connected to operate in conjunction with the differential 170.

The first embodiment of the present invention has a power transmission path in which the rotating power of the rotor 20 is transmitted to the differential 170 via the first planetary gear set 200. In this case, while the rotating power is being transmitted to the differential 170 via the first planetary gear set 200, gear reduction ratio varies depending on the lateral movement of the sleeve 90 of the synchronizer 115. This gear reduction ratio will be described below.

The single-shaft two-speed drive system according to the embodiment of the present invention, which is shown in FIG. 2, is characterized in that the sleeve 90 of the synchronizer 115 is moved in the direction of the fastening cone 70 and coupled to the fastening cone 70 to thus obtain a single gear reduction ratio and the sleeve 90 is moved in the direction of the integrating cone 120 and coupled to the integrating cone 120 to thus obtain driving power without gear reduction.

Next, a specific embodiment of the present invention related to the case where a single planetary gear set is present, i.e., the case where only the first planetary gear set 200 is present, as in the embodiment of the present invention shown in FIG. 2, in which gear reduction ratio varies, will be described.

In this embodiment, the sleeve 90 is moved in the direction of the fastening cone 70. When the sleeve 90 is moved in the direction of the fastening cone 70 and coupled to the fastening cone 70, the first ring gear 60 is stopped. In this case, the driving of the first sun gear 30 becomes the output of the first carrier 50. Accordingly, the number of revolutions of the first carrier 50 is generally reduced at a ratio of 3 to 4:1 with respect to the number of revolutions of the first sun gear 30.

This will be described using equations as follows:

Number of teeth $Z_{S1}$ of first sun gear×Number of revolutions $N_{S1}$ of first sun gear+Number of teeth $Z_{R1}$ of first ring gear×Number $N_{R1}$ of revolutions of first ring gear=(Number of teeth $Z_{S1}$ of first sun gear+Number of teeth $Z_{R1}$ of first ring gear)×Number of revolutions $N_{C1}$ of first carrier (1)

When 0 is substituted for the number of revolutions $N_{R1}$ of the first ring gear and the equation is rearranged, $$\text{Number of revolutions } N_{C1} \text{ of first carrier} = \frac{\text{Number of teeth } Z_{S1} \text{ of first sun gear}}{\text{Number of teeth } Z_{S1} \text{ of first sun gear} + \text{Number of teeth } Z_{R1} \text{ of first ring gear}} \times \text{Number of revolutions } N_{S1} \text{ of first sun gear} \quad (2)$$

In Equation 2, for example, when 30 and 60 are substituted for the number of teeth $Z_{S1}$ of the first sun gear and the number of teeth $Z_{R1}$ of the first ring gear, respectively, the number of revolutions $N_{C1}$ of the first carrier becomes ⅓ of the number of revolutions $N_{S1}$ of the first sun gear. When the number of teeth $Z_{S1}$ of the first sun gear is made different from the number of teeth $Z_{R1}$ of the first ring gear, an appropriate gear reduction ratio can be formed. Generally, the number of revolutions $N_{C1}$ of the first carrier is reduced at a ratio 3 to 4:1 with respect to the number of revolutions $N_{S1}$ of the first sun gear.

Furthermore, in the case where the sleeve 90 is moved in the direction of the integrating cone 120, when the sleeve 90 is moved in the direction of the integrating cone 120 and coupled to the integrating cone 120, the first sun gear 30 and the first ring gear 60 are directly connected to each other and driven at a ratio of 1:1. That is, since the first sun gear 30 and the first ring gear 60 are coupled to each other and thus the speed of the motor is transferred to the differential without change, high-speed rotation is performed without gear reduction.

Accordingly, when only the first planetary gear set 200 is present as in the embodiment of the present invention shown in FIG. 2, gear reduction ratio is formed based on the number of teeth $Z_{S1}$ of the first sun gear is different from the number of teeth $Z_{R1}$ of the first ring gear when the sleeve 90 is moved in the direction of the fastening cone 70, and the first sun gear 30 and the first ring gear 60 are combined with each other and rotated without gear reduction when the sleeve 90 is moved in the direction of the integrating cone 120. A single-shaft two-speed drive system capable of enabling two speeds by using only a single planetary gear set, such as the embodiment of the present invention, may be constructed.

Since driving power is generated along the center line of the same axis and the fastening cone 70, the synchronizer 115 and the integrating cone 120 are provided to thus perform actively gear reduction and then transmission, the first embodiment of the present invention can reduce noise and vibration compared to an existing multi-axis drive system in which operating noise and vibration increase during high-speed rotation.

Figure 5:
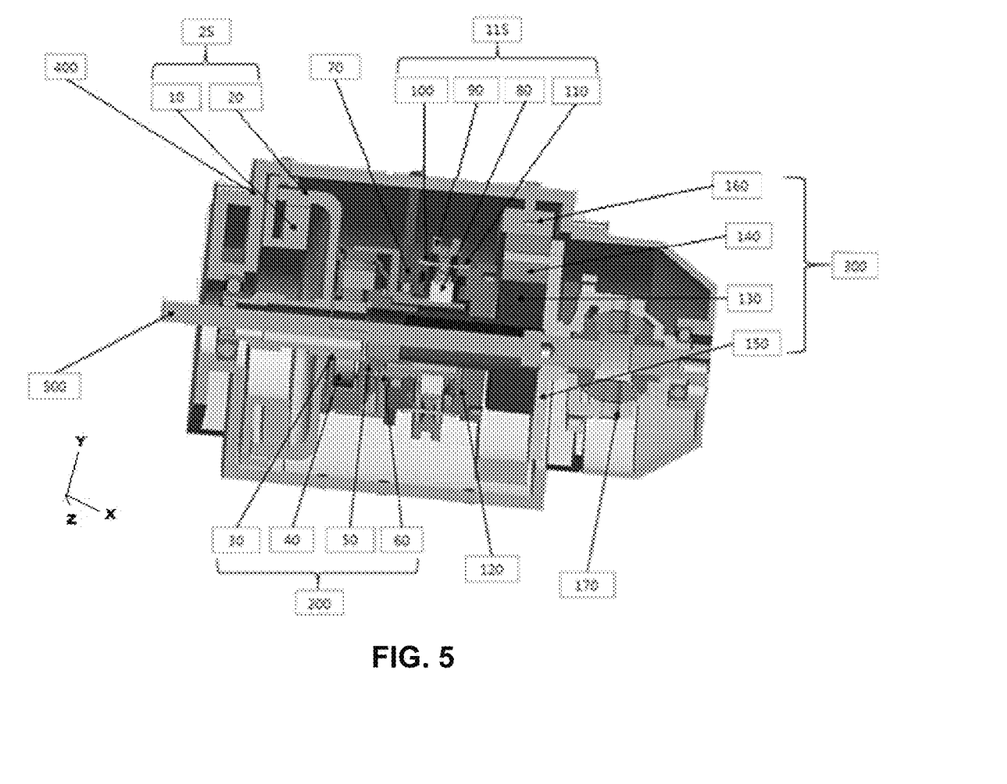
FIG. 5 is a sectional view showing the structure of a single-shaft two-speed drive system including two planetary gear sets and a synchronizer according to an embodiment of the present invention.
Figure 6:
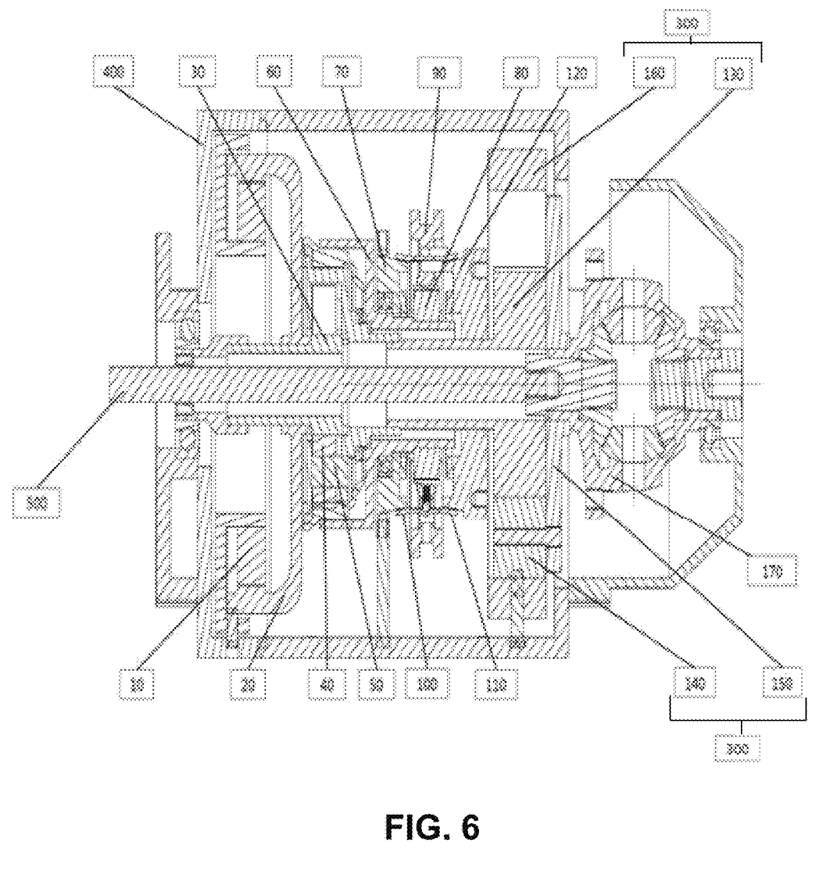
FIG. 6 is a plan sectional view of FIG. 5.

FIG. 5 shows the structure of a single-shaft two-speed drive system including two planetary gear sets and a synchronizer according to an embodiment of the present invention. FIG. 6 is a plan sectional view of FIG. 5. In FIGS. 5 and 6, the illustration of the teeth of gears is omitted.

Referring to the FIG. 5, the single-shaft two-speed drive system includes a housing 400, a motor unit 25, a first planetary gear set 200, a fastening cone 70, a synchronizer 115, an integrating cone 120, a second planetary gear set 300, and a differential 170.

The embodiment of the present invention shown in FIG. 5 is the case where one more planetary gear set is added to the embodiment of the present invention shown in FIG. 2. The embodiment of the present invention shown in FIG. 5 is directed to a single-shaft two-speed drive system in which a second planetary gear set 300 is additionally disposed on the same axial line between the integrating cone 120 and the differential 170 in FIG. 2.

The embodiment of the present invention shown in FIG. 5 includes all the motor unit 25, the first planetary gear set 200, the fastening cone 70, the synchronizer 115, the integrating cone 120 and the differential 170 described in conjunction with the embodiment of the present invention shown in FIG. 2. Furthermore, in this embodiment, the second planetary gear set 300 is additionally disposed between the integrating cone 120 and the differential 170.

The motor unit 25 includes a stator 10 and a rotor 20, the first planetary gear set 200 includes a first sun gear 30, a plurality of first planetary gears 40, a first ring gear 60 and a first carrier 50, and the synchronizer 115 includes a hub 80, a sleeve 90, a first synchronizer ring 100, and a second synchronizer ring 110. The second planetary gear set 300 includes a second sun gear 130, a plurality of second planetary gears 140, a second ring gear 160, and a second carrier 150.

In the embodiment of the present invention shown in FIG. 5, the motor unit 25, the first planetary gear set 200, the fastening cone 70, the synchronizer 115, the integrating cone 120, and the differential 170 are the same as those described in conjunction with the embodiment of the present invention shown in FIG. 2.

The second planetary gear set 300 is configured to include: the second sun gear 130 located on the other side surface of the integrating cone 120, and configured to be rotated in conjunction with the first carrier 50 and have a plurality of gear teeth on the outer circumferential surface thereof; the plurality of second planetary gears 140 configured to engage with the gear teeth of the second sun gear 130 and be operated in conjunction with the second sun gear 130; the second ring gear 160 configured to have an internal gear, engaging with the second planetary gears 140, on the inner circumferential surface thereof, and fastened onto the inner circumferential surface of the housing 400; and the second carrier 150 connected such that the plurality of second planetary gears 140 are operated in conjunction with each other. The second planetary gears 140 are rotatably coupled to the second carrier 150, and the second carrier 150 is rotated by the constraining force of the second planetary gears 140.

The differential 170 is connected to be operated in conjunction with the second carrier 150.

The second embodiment of the present invention having the above-described configuration is described as follows.

When power is applied to the coil, the rotor 20 is rotated. Since the rotor 20 engages with the first sun gear 30, rotating power is transmitted to the first sun gear 30 and rotates the first sun gear 30 during the rotation of the rotor 20. The first sun gear 30 rotates the engaged first planetary gears 40. The first sun gear 30 and the first planetary gears 40 are rotated in opposite directions, and the first planetary gears 40 and the first carrier 50 are rotated in the same direction. The second sun gear 130 is rotated in conjunction with the first carrier 50, and the second sun gear 130 rotates the engaged second planetary gears 140. Since the second ring gear 160 is fastened onto the inner circumferential surface of the housing 400, the second ring gear 160 is not rotated. The second sun gear 130 and the second planetary gears 140 are rotated in opposite directions, and the second planetary gears 140 and the second carrier 150 are rotated in the same direction.

The second embodiment of the present invention has a power transmission path in which the rotating power of the rotor 20 is transmitted to the differential 170 via the first planetary gear set 200 and the second planetary gear set 300. In this case, while the rotating power is being transmitted to the differential 170 via the first planetary gear set 200 and the second planetary gear set 300, gear reduction ratio varies depending the lateral movement of the sleeve 90 of the synchronizer 115. This gear reduction ratio will be described below.

The single-shaft two-speed drive system according to the embodiment of the present invention shown in FIG. 5 is characterized in that the sleeve 90 of the synchronizer 115 is moved in the direction of the fastening cone 70 and coupled to the fastening cone 70 to thus obtain one gear reduction ratio and the sleeve 90 is moved in the direction of the integrating cone 120 and coupled to the integrating cone 120 to thus obtain another gear reduction ratio.

Next, a specific embodiment of the present invention related to the case where two planetary gear sets are present, i.e., the case where both the second planetary gear set 300 is provided in addition to the first planetary gear set 200, as the embodiment of the present invention shown in FIG. 5, will be described.

In this case, the sleeve 90 is moved in the direction of the fastening cone 70. When the sleeve 90 is moved in the direction of the fastening cone 70 and coupled to the fastening cone 70, the first ring gear 60 is stopped. In this case, the driving of the first sun gear 30 becomes the output of the first carrier 50. Accordingly, the number of revolutions of the first carrier 50 is generally reduced at a ratio of 3 to 4:1 with respect to the number of revolutions of the first sun gear 30.

This will be described using equations as follows:

Number of teeth $Z_{S1}$ of first sun gear×Number of revolutions $N_{S1}$ of first sun gear+Number of teeth $Z_{R1}$ of first ring gear×Number $N_{R1}$ of revolutions of first ring gear=(Number of teeth $Z_{S1}$ of first sun gear+Number of teeth $Z_{R1}$ of first ring gear)×Number of revolutions $N_{C1}$ of first carrier (3)

When 0 is substituted for the number of revolutions $N_{R1}$ of the first ring gear and the equation is rearranged, Number of revolutions $N_{C1}$ of first carrier = (4)

$$\frac{\text{Number of teeth } Z_{S1} \text{ of first sun gear}}{\text{Number of teeth } Z_{S1} \text{ of first sun gear} + \text{Number of teeth } Z_{R1} \text{ of first ring gear}} \times$$

Number of revolutions $N_{S1}$ of first sun gear

In Equation 4, for example, when 30 and 60 are substituted for the number of teeth $Z_{S1}$ of the first sun gear and the number of teeth $Z_{R1}$ of the first ring gear, respectively, the number of revolutions $N_{C1}$ of the first carrier becomes ⅓ of the number of revolutions $N_{S1}$ of the first sun gear. When the number of teeth $Z_{S1}$ of the first sun gear is made different from the number of teeth $Z_{R1}$ of the first ring gear, an appropriate gear reduction ratio can be formed. Generally, the number of revolutions $N_{C1}$ of the first carrier is reduced at a ratio of 3 to 4:1 with respect to the number of revolutions $N_{S1}$ of the first sun gear.

Next, since the number of revolutions $N_{C1}$ of the first carrier becomes the number of revolutions $N_{S2}$ of the second sun gear and the second ring gear 160 is fastened onto the wall of the housing, the driving of the second sun gear 130 becomes the output of the second carrier 150. In this case, the number of revolutions $N_{C2}$ of the second carrier is generally reduced at a ratio of 3 to 4:1 with respect to the number of revolutions $N_{R2}$ of the second sun gear.

This will be described using equations as follows:

Number of teeth $Z_{S2}$ of second sun gear×Number of revolutions $N_{R2}$ of second sun gear+Number of teeth $Z_{R2}$ of second ring gear×Number $N_{R2}$ of revolutions of second ring gear=(Number of teeth $Z_{S2}$ of second sun gear+Number of teeth $Z_{R2}$ of second ring gear)×Number of revolutions $N_{C2}$ of second carrier (5)

When 0 is substituted for the number of revolutions $N_{R2}$ of the second ring gear and the equation is rearranged, Number of revolutions $N_{C2}$ of second carrier = (6)

$$\frac{\text{Number of teeth } Z_{S2} \text{ of second sun gear}}{\text{Number of teeth } Z_{S2} \text{ of second sun gear} + \text{Number of teeth } Z_{R2} \text{ of second ring gear}} \times$$

Number of revolutions $N_{S2}$ of second sun gear

In Equation 6, for example, when 30 and 60 are substituted for the number of teeth $Z_{S2}$ of the second sun gear and the number of teeth $Z_{R2}$ of the second ring gear, respectively, the number of revolutions $N_{C2}$ of the second carrier becomes ⅓ of the number of revolutions $N_{S2}$ of the second sun gear. When the number of teeth $Z_{S2}$ of the second sun gear is made different from the number of teeth $Z_{R2}$ of the second ring gear, an appropriate gear reduction ratio can be formed. Generally, the number of revolutions $N_{C2}$ of the second carrier is reduced at a ratio of 3 to 4:1 with respect to the number of revolutions $N_{S2}$ of the second sun gear.

Accordingly, when the sleeve 90 is moved in the direction of the fastening cone 70, the number of revolutions $N_{S1}$ of the first carrier 50 is generally reduced 3 to 4 times compared to the number of revolutions $N_{C1}$ of the first sun gear 30, and the number of revolutions $N_{C1}$ of the first carrier 50 reduced 3 to 4 times becomes the number of revolutions $N_{S2}$ of the second sun gear 130. Furthermore, the number of revolutions $N_{C2}$ of the second carrier 150 is generally reduced 3 to 4 times compared to the number of revolutions $N_{S2}$ of the second sun gear 130. Finally, the number of revolutions $N_{C2}$ of the second carrier 150 is generally reduced 9 to 16 times compared to the number of revolutions $N_{S1}$ of the first sun gear 30. According to the embodiment of the present invention, the number of teeth $Z_{S1}$ of the first sun gear, the number of teeth $Z_{R1}$ of the first ring gear, the number of teeth $Z_{S2}$ of the second sun gear and the number of teeth $Z_{R2}$ of the second ring gear are made different from one another, an appropriate gear reduction ratio can be formed.

Furthermore, in this case, the sleeve 90 is moved in the direction of the integrating cone 120. When the sleeve 90 is moved in the direction of the integrating cone 120 and coupled to the integrating cone 120, the first carrier 50 and the first ring gear 60 are directly connected to each other and driven at a ratio 1:1 without gear reduction, and thus the number of revolutions of the first sun gear 30 becomes the input of the second sun gear 130. Accordingly, since the number of revolutions $N_{S1}$ of the first sun gear 30 becomes the number of revolutions $N_{S2}$ of the second sun gear 130 and the second ring gear 160 is fastened onto the wall of the housing, the driving of the second sun gear 130 becomes the output of the second carrier 150. In this case, the number of revolutions $N_{C2}$ of the second carrier is generally reduced at a ratio of 3 to 4:1 with respect to the number of revolutions $N_{S2}$ of the second sun gear.

This will be described using equations as follows:

Number of teeth $Z_{S2}$ of second sun gear×Number of revolutions $N_{S2}$ of second sun gear+Number of teeth $Z_{R2}$ of second ring gear×Number $N_{R2}$ of revolutions of second ring gear=(Number of teeth $Z_{S2}$ of second sun gear+Number of teeth $Z_{R2}$ of second ring gear)×Number of revolutions $N_{C2}$ of second carrier (7)

When 0 is substituted for the number of revolutions $N_{R2}$ of the second ring gear and the equation is rearranged, Number of revolutions $N_{C2}$ of second carrier = (8)

$$\frac{\text{Number of teeth } Z_{S2} \text{ of second sun gear}}{\text{Number of teeth } Z_{S2} \text{ of second sun gear} + \text{Number of teeth } Z_{R2} \text{ of second ring gear}} \times$$

Number of revolutions $N_{S2}$ of second sun gear

In Equation 8, for example, when 30 and 60 are substituted for the number of teeth $Z_{S2}$ of the second sun gear and the number of teeth $Z_{R2}$ of the second ring gear, respectively, the number of revolutions $N_{C2}$ of the second carrier becomes ⅓ of the number of revolutions $N_{S2}$ of the second sun gear. When the number of teeth $Z_{S2}$ of the second sun gear is made different from the number of teeth $Z_{R2}$ of the second ring gear, an appropriate gear reduction ratio can be formed. Generally, the number of revolutions $N_{C2}$ of the second carrier is reduced at a ratio of 3 to 4:1 with respect to the number of revolutions $N_{S2}$ of the second sun gear.

In summary, in the case where two planetary gear sets are included, as in the embodiment of the present invention shown in FIG. 5, the number of revolutions $N_{C2}$ of the second carrier 150 is generally reduced 9 to 16 times compared to the number of revolutions $N_{S1}$ of the first sun gear 30 when the sleeve 90 is moved in the direction of the fastening cone 70, and the number of revolutions $N_{C2}$ of the second carrier 150 is generally reduced 3 to 4 times compared to the number of revolutions of $N_{S1}$ the first sun gear 30 when the sleeve 90 is moved in the direction of the integrating cone 120. The second embodiment of the present invention can obtain a more increased gear reduction ratio than the above-described first embodiment of the present invention when the driving power of the motor unit 25 is transmitted to the differential 170 via the first and second planetary gear sets 200 and 300 and the synchronizer 115. According to the embodiment of the present invention, the number of teeth $Z_{S1}$ of the first sun gear, the number of teeth $Z_{R1}$ of the first ring gear, the number of teeth $Z_{S2}$ of the second sun gear and the number of teeth $Z_{R2}$ of the second ring gear are made different from one another, an appropriate gear reduction ratio can be formed.

A single-shaft two-speed drive system capable of two speeds, which can implement the case where high gear reduction is obtained and the case where low gear reduction is obtained by using the two planetary gear sets and the synchronizer as in the second embodiment of the present invention, can be constructed. The second embodiment of the present invention has the advantage of further increasing gear reduction ratio in addition to the advantage of the first embodiment.

The single-shaft two-speed drive system according to the present invention is improved over the conventional technologies. At least one planetary gear set, the motor, and the differential are densely disposed along the same axial line within a single housing. Accordingly, an installation space can be reduced by decreasing the volume of the system, efficiency can be increased by reducing the number of parts, costs and weight, noise and vibration can be reduced due to the characteristic in which the generation of power and gear reduction action are simultaneously performed on the single same axial line, and fuel efficiency can be increased by extending a gear reduction range. Furthermore, the synchronizer is provided between the planetary gear set and the differential or between the two planetary gear sets, thereby achieving the effect of enabling gear reduction to be actively performed.

It will be apparent to those skilled in the art that the present invention is not limited to the embodiments described in the detailed description and various modifications and alterations can be made within a range that does not depart from the scope of the present invention. Accordingly, these modifications and alterations should be interpreted as falling within the claims of the present invention or a range equivalent to the claims.

What is claimed is:

1. A single-shaft two-speed drive system configured to enable generation of power and gear reduction to be performed on a single drive shaft, the system comprising:
   a housing;
   a motor unit including a stator fastened onto an inner circumferential surface of the housing and configured such that a coil is wound around an outer circumferential surface thereof, and a rotor disposed outside the stator and configured to be rotated in response to application of power to the coil;
   a first planetary gear set including:
   a first sun gear configured to be rotated in conjunction with the rotor, and configured such that a plurality of gear teeth are formed on an outer circumferential surface thereof;
   a plurality of first planetary gears configured to engage with gear teeth of the first sun gear and be operated in conjunction with the first sun gear;
   a first ring gear configured such that an internal gear adapted to engage with the first planetary gears is formed on an inner circumferential surface thereof; and
   a first carrier configured to couple the plurality of first planetary gears so that they are operated in conjunction with each other;
   a fastening cone located on an outer circumferential surface of the first ring gear, and fastened to an inner circumferential surface of the housing;
   an integrating cone mounted on an outer circumferential surface of the first carrier;
   a synchronizer disposed between the fastening cone and the integrating cone; and
   a differential located on a remaining side surface of the integrating cone, and connected to be operated in conjunction with the first carrier;
   wherein the synchronizer includes: a hub mounted on an outer circumferential surface of the first ring gear, a sleeve coupled onto an outer circumferential surface of the hub in a spline manner, and configured to be laterally moved along the outer circumferential surface of the hub; and first and second synchronizer rings disposed on opposing surfaces of the sleeve; wherein the first synchronizer ring is located on one side surface of the fastening cone and the second synchronizer ring is located on one side surface of the integrating cone; and
   wherein the sleeve is moved in a direction of the fastening cone and coupled to the fastening cone to thus obtain a single gear reduction ratio and the sleeve is moved in a direction of the integrating cone and coupled to the integrating cone to thus obtain driving power without gear reduction.

2. A single-shaft two-speed drive system configured to enable generation of power and gear reduction to be performed on a single drive shaft, the system comprising:
   a housing;
   a motor unit including a stator fastened onto an inner circumferential surface of the housing and configured such that a coil is wound around an outer circumferential surface thereof, and a rotor disposed outside the stator and configured to be rotated in response to application of power to the coil;
   a first planetary gear set including:
   a first sun gear configured to be rotated in conjunction with the rotor, and configured such that a plurality of gear teeth are formed on an outer circumferential surface thereof;
   a plurality of first planetary gears configured to engage with gear teeth of the first sun gear and be operated in conjunction with the first sun gear;
   a first ring gear configured such that an internal gear adapted to engage with the first planetary gears is formed on an inner circumferential surface thereof; and
   a first carrier configured to couple the plurality of first planetary gears so that they are operated in conjunction with each other;

a fastening cone located on an outer circumferential surface of the first ring gear, and fastened to an inner circumferential surface of the housing;

an integrating cone mounted on an outer circumferential surface of the first carrier;

a synchronizer disposed between the fastening cone and the integrating cone; and a differential located on a side of the integrating cone opposing the synchronizer, and connected to be operated in conjunction with the first carrier;

wherein the synchronizer includes: a hub mounted on an outer circumferential surface of the first ring gear, a sleeve coupled onto an outer circumferential surface of the hub in a spline manner, and configured to be laterally moved along the outer circumferential surface of the hub; and first and second synchronizer rings disposed on opposing surfaces of the sleeve; wherein the first synchronizer ring is located on one side surface of the fastening cone and the second synchronizer ring is located on one side surface of the integrating cone; and a second planetary gear set disposed between the integrating cone and the differential;

wherein the second planetary gear set includes:

a second sun gear located on a remaining side surface of the integrating cone, and configured to be rotated in conjunction with the first carrier and have a plurality of gear teeth on an outer circumferential surface thereof;

a plurality of second planetary gears configured to engage with gear teeth of the second sun gear and be operated in conjunction with the second sun gear;

a second ring gear configured to have an internal gear, engaging with the second planetary gears, on an inner circumferential surface thereof, and fastened onto an inner circumferential surface of the housing; and a second carrier connected such that the plurality of second planetary gears are operated in conjunction with each other;

wherein the differential is connected to be operated in conjunction with the second carrier; and wherein the sleeve is moved in a direction of the fastening cone and coupled to the fastening cone to thus obtain one gear reduction ratio, and the sleeve is moved in a direction of the integrating cone and coupled to the integrating cone to thus obtain another gear reduction ratio.

* * * * *